(12) United States Patent
Li et al.

(10) Patent No.: US 10,963,996 B2
(45) Date of Patent: Mar. 30, 2021

(54) IMAGE PROCESSING METHOD AND APPARATUS

(71) Applicant: Huawei Technologies Co., Ltd., Guangdong (CN)

(72) Inventors: Meng Li, Beijing (CN); Hai Chen, Shenzhen (CN); Jianhua Zheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 86 days.

(21) Appl. No.: 16/282,061

(22) Filed: Feb. 21, 2019

(65) Prior Publication Data

US 2019/0228509 A1    Jul. 25, 2019

Related U.S. Application Data

(63) Continuation of application No. PCT/CN2016/096280, filed on Aug. 22, 2016.

(51) Int. Cl.
*G06K 9/00* (2006.01)
*G06T 5/00* (2006.01)
(Continued)

(52) U.S. Cl.
CPC ............... *G06T 5/008* (2013.01); *G06T 7/90* (2017.01); *H04N 9/64* (2013.01); *G06T 5/40* (2013.01);
(Continued)

(58) Field of Classification Search
CPC ......... G06T 5/008; G06T 5/009; G06T 5/007; G06T 5/40; G06T 5/00; G06T 7/90; G06T 11/001; G06T 11/40; G06T 19/20; G06T 2207/10024; G06T 2207/20208; G06K 9/6289; G06K 9/4661; G06K 15/027; G06K 15/129; G06K 15/1802; G06K 15/1868; G06K 15/1878; G06K 15/4015;
(Continued)

(56) References Cited

U.S. PATENT DOCUMENTS 5,774,112 A * 6/1998 Kasson .................... G09G 5/02
345/593
10,148,907 B1 * 12/2018 Wu .......................... H04N 7/01
(Continued)

FOREIGN PATENT DOCUMENTS

CN    101201470 A    6/2008
CN    101840689 A    9/2010
(Continued)

*Primary Examiner* — Jose L Couso
(74) *Attorney, Agent, or Firm* — Kilpatrick Townsend & Stockton LLP

(57) ABSTRACT

An image processing method and apparatus are disclosed, to improve quality of an image on which color processing is performed. The method includes: determining color values of N color components of each pixel of a to-be-processed image, where N is a natural number greater than 1; determining N ratios of a luminance value of each pixel to the color values of the N color components; determining N first color adjustment coefficients based on the N ratios; and performing color processing on each pixel based on the N first color adjustment coefficients and the color values of the N color components to obtain a target image.

21 Claims, 3 Drawing Sheets

(51) Int. Cl.
*H04N 9/64* (2006.01)
*G06T 7/90* (2017.01)
*G06T 5/40* (2006.01)

(52) U.S. Cl.
CPC .............. *G06T 2207/10024* (2013.01); *G06T 2207/20208* (2013.01)

(58) Field of Classification Search
CPC ......... G06K 15/407; G06K 2215/0094; H04N 9/64; H04N 9/68; H04N 9/67; H04N 9/69; H04N 9/643; H04N 9/646; H04N 9/70; H04N 9/71; H04N 9/73–78; H04N 5/232; H04N 5/235; H04N 5/2351; H04N 5/57; H04N 5/2355; H04N 1/46; H04N 1/6033; H04N 1/40012; H04N 1/40025; H04N 1/40087; H04N 1/54; H04N 1/56; H04N 1/60–6008; H04N 1/6013–6027; H04N 1/6038–6041; H04N 1/6058–608; H04N 1/62; G09G 3/2003; G09G 3/3607; G09G 5/02; G09G 5/10; G09G 2320/0242; G09G 2320/0276; G09G 2320/043; G09G 2320/0673; G09G 2320/0233; G09G 2320/0626; G09G 2320/0666; G09G 2320/0646; G09G 2340/06; G09G 2340/16
See application file for complete search history.

(56) References Cited

U.S. PATENT DOCUMENTS

| | | | | |
|---|---|---|---|---|
| 2003/0021488 A1* | 1/2003 | Shaw | .................. | G06T 5/20 382/260 |
| 2006/0132659 A1* | 6/2006 | Kimura | .................. | G09G 3/20 348/631 |
| 2009/0167672 A1* | 7/2009 | Kerofsky | ............. | G09G 3/3413 345/102 |
| 2009/0167751 A1* | 7/2009 | Kerofsky | ............. | G09G 3/3611 345/214 |
| 2009/0208099 A1 | 8/2009 | Yoshii et al. | | |
| 2011/0084981 A1* | 4/2011 | Abe | ......................... | H04N 9/77 345/590 |
| 2011/0150356 A1* | 6/2011 | Jo | ........................... | G06T 5/007 382/269 |
| 2011/0235945 A1* | 9/2011 | Wakazono | ......... | H04N 9/04515 382/300 |
| 2012/0057803 A1* | 3/2012 | Wakazono | ............. | G06T 5/002 382/274 |
| 2013/0093656 A1 | 4/2013 | Wang | | |
| 2014/0254928 A1* | 9/2014 | Tsai | .................... | H04N 19/117 382/166 |
| 2014/0267826 A1 | 9/2014 | Danowitz et al. | | |
| 2017/0064334 A1* | 3/2017 | Minoo | .................... | H04N 1/64 |
| 2017/0078706 A1* | 3/2017 | Van Der Vleuten | ... | H04N 19/44 |
| 2017/0085895 A1* | 3/2017 | Gu | ......................... | H04N 19/46 |
| 2017/0103729 A1* | 4/2017 | Huang | .................... | H04N 9/68 |
| 2017/0330529 A1* | 11/2017 | Van Mourik | ......... | G09G 3/2003 |
| 2018/0204528 A1* | 7/2018 | Miyazawa | ............. | G06T 5/009 |
| 2018/0367778 A1* | 12/2018 | Borer | .................... | G06T 5/009 |
| 2019/0311694 A1* | 10/2019 | Van Mourik | ...... | H04N 21/4854 |

FOREIGN PATENT DOCUMENTS

| | | |
|---|---|---|
| CN | 102045575 A | 5/2011 |
| CN | 104052979 A | 9/2014 |
| CN | 104144332 A | 11/2014 |
| EP | 1480468 A2 | 11/2004 |

\* cited by examiner

IMAGE PROCESSING METHOD AND APPARATUS

CROSS-REFERENCE TO RELATED APPLICATIONS

This application is a continuation of International Application No. PCT/CN2016/096280 filed on Aug. 22, 2016, the disclosure of which is hereby incorporated by reference in its entirety.

TECHNICAL FIELD

The present application relates to the field of image processing, and in particular, to an image processing method and apparatus.

BACKGROUND

In the field of image processing, a color of an image is usually adjusted. For example, in a process of converting the image between a high dynamic range (HDR) and a standard dynamic range (SDR), a dynamic range of the image is adjusted and the color of the image is processed. FIG. 1 shows a common application scenario of an image processing method. An image processing apparatus may perform specified image processing (for example, dynamic range adjustment processing or color processing) on an input to-be-processed image, and output a processed target image. The dynamic range adjustment processing may be converting a first dynamic range image to a second dynamic range image. A dynamic range may be a ratio of a maximum luminance value to a minimum luminance value of the image. Dynamic range adjustment causes an offset of an image color (that is, a color deviation). In the prior art, a relatively common manner of the color processing is adjusting a color value of the image based on a color adjustment coefficient. However, the color deviation caused by the dynamic range adjustment cannot be adjusted by using an existing color adjustment technology.

The prior art mainly has the following problems: FIG. 2 shows color distribution of an image obtained based on a color processing manner in the prior art when a luminance is given. A horizontal coordinate of a coordinate system represents a U component and a vertical coordinate of the coordinate system represents a V component. Each dashed line passing through a central point in the figure represents an ideal distribution curve of a same hue with different saturations. Each solid line in the figure represents an actual distribution curve (where the actual distribution curve may be obtained through measurement in a color calibration experiment) of the same hue after color processing. A gray point represents a reference hue. It can be learned from FIG. 2 that there is a deviation between the actual distribution curve and the ideal distribution curve. In other words, colors of a same hue are not evenly distributed on straight lines passing through the central point. It can be learned that the color processing method in the prior art may cause a color deviation in some cases, and consequently, affect image quality.

SUMMARY

Embodiments of the present application provide an image processing method and apparatus, to improve quality of an image on which color processing is performed.

According to a first aspect, an image processing method is provided. The image processing method includes: determining color values of N color components of each pixel of a to-be-processed image, where N is a natural number greater than 1; determining N ratios of a luminance value of each pixel to the color values of the N color components; determining N first color adjustment coefficients based on the N ratios; and performing color processing on each pixel based on the N first color adjustment coefficients and the color values of the N color components to obtain a target image.

In an embodiment of the present application, the N first color adjustment coefficients are determined based on the N ratios of the luminance value of each pixel of the to-be-processed image to the color values of the N color components, so as to perform color processing on the to-be-processed image. Therefore, a color deviation of the image on which color processing is performed can be reduced, and quality of the image on which color processing is performed is improved.

In a possible implementation, the determining N first color adjustment coefficients based on the N ratios includes: determining N second color adjustment coefficients of each pixel based on the N ratios and a first power function, where the N second color adjustment coefficients are values obtained by respectively substituting the N ratios into the first power function; and determining the N first color adjustment coefficients based on the N second color adjustment coefficients.

In this embodiment of the present application, the N second color adjustment coefficients are determined based on the first power function and the N ratios of the luminance value of each pixel of the to-be-processed image to the color values of the N color components, and the N first color adjustment coefficients are determined based on the N second color adjustment coefficients, so as to perform color processing on the to-be-processed image. Therefore, the color deviation of the image on which color processing is performed can be reduced, and the quality of the image on which color processing is performed is improved.

In a possible implementation, the determining the N first color adjustment coefficients based on the N second color adjustment coefficients includes: determining the N second color adjustment coefficients as the N first color adjustment coefficients.

In a possible implementation, the method further includes: determining a third color adjustment coefficient of each pixel; and the determining the N first color adjustment coefficients based on the N second color adjustment coefficients includes: determining the N first color adjustment coefficients based on the third color adjustment coefficient and the N second color adjustment coefficients, where the N first color adjustment coefficients are N products obtained by multiplying the third color adjustment coefficient by the N second color adjustment coefficients respectively.

In a possible implementation, an exponent of the first power function is determined by using a lookup table.

In a possible implementation, the to-be-processed image is an image on which dynamic range adjustment processing has been performed; and the determining a third color adjustment coefficient of each pixel includes: determining an electrical signal ratio of an electrical signal value of each pixel after the dynamic range adjustment processing to an electrical signal value of the pixel before the dynamic range adjustment processing; and determining the third color adjustment coefficient based on the electrical signal ratio.

In this embodiment of the present application, the third color adjustment coefficient is determined based on the electrical signal ratio of the corresponding electrical signal value after the dynamic range adjustment processing is performed on the to-be-processed image to the corresponding electrical signal value before the dynamic range adjustment processing is performed on the to-be-processed image, and the N first color adjustment coefficients of the to-be-processed image are determined based on the third color adjustment coefficient and the second color adjustment coefficients, so as to perform color processing on the to-be-processed image. Therefore, the color deviation caused by the dynamic range adjustment processing to the to-be-processed image can be reduced, and the quality of the image on which color processing is performed is improved.

In a possible implementation, the determining the third color adjustment coefficient based on the electrical signal ratio includes: determining the third color adjustment coefficient based on the electrical signal ratio and a second power function, where the third color adjustment coefficient is a value obtained by substituting the electrical signal ratio into the second power function.

In a possible implementation, an exponent of the second power function is determined by using a lookup table.

In a possible implementation, the N first color adjustment coefficients are preset.

In this embodiment of the present application, at least two of the N preset first color adjustment coefficients are different, and color processing is performed on the to-be-processed image based on the N first color adjustment coefficients. Therefore, the quality of the image on which color processing is performed can be improved.

In a possible implementation, the N color components include an R component, a G component, and a B component in an RGB space, and the performing color processing on the to-be-processed image based on the N first color adjustment coefficients and the color values of the N color components to obtain a target image includes: performing color processing on the to-be-processed image based on the following formula to obtain the target image:

$$\begin{cases} R' = a_1(R-Y)+Y \\ G' = a_2(G-Y)+Y, \\ B' = a_3(B-Y)+Y \end{cases}$$

where Y represents a luminance value of the to-be-processed image, R, G, and B respectively represent a color value of the R component, a color value of the G component, and a color value of the B component in the to-be-processed image, R', G', and B' respectively represent a color value of an R component, a color value of a G component, and a color value of a B component in the target image, $a_1$ represents a first color adjustment coefficient corresponding to the R component, $a_2$ represents a first color adjustment coefficient corresponding to the G component, and $a_3$ represents a first color adjustment coefficient corresponding to the B component.

In a possible implementation, the N color components include a U component and a V component in a YUV space, and the performing color processing on the to-be-processed image based on the N first color adjustment coefficients and the color values of the N color components to obtain a target image includes: performing color processing on the to-be-processed image based on the following formula to obtain the target image:

$$\begin{cases} u' = a_4 u \\ v' = a_5 v \end{cases},$$

where u and v respectively represent a color value of the U component and a color value of the V component in the to-be-processed image, u' and v' respectively represent a color value of a U component and a color value of a V component in the target image, $a_4$ represents a first color adjustment coefficient corresponding to the U component, and as represents a first color adjustment coefficient corresponding to the V component.

According to a second aspect, an image processing method is provided. The image processing method includes: determining color values of N color components of each pixel of a to-be-processed image, where the to-be-processed image is an image on which dynamic range adjustment processing has been performed, and N is a natural number greater than 1; determining N ratios of a luminance value of each pixel to the color values of the N color components; determining N second color adjustment coefficients of each pixel based on the N ratios and a first power function, where the N second color adjustment coefficients are values obtained by respectively substituting the N ratios into the first power function; determining an electrical signal ratio of an electrical signal value of each pixel after the dynamic range adjustment processing to an electrical signal value of the pixel before the dynamic range adjustment processing; determining a third color adjustment coefficient based on the electrical signal ratio; determining N first color adjustment coefficients based on the third color adjustment coefficient and the N second color adjustment coefficients, where the N first color adjustment coefficients are N products obtained by multiplying the third color adjustment coefficient by the N second color adjustment coefficients respectively; and performing color processing on each pixel based on the N first color adjustment coefficients and the color values of the N color components to obtain a target image.

In an embodiment of the present application, the N first color adjustment coefficients of the to-be-processed image are determined based on the N ratios of the luminance value of the to-be-processed image to the color values of the N color components and the electrical signal ratio of the corresponding electrical signal value after the dynamic range adjustment processing is performed on the to-be-processed image to the corresponding electrical signal value before the dynamic range adjustment processing is performed on the to-be-processed image, so as to perform color processing on the to-be-processed image. Therefore, a color deviation caused by the dynamic range adjustment processing to the to-be-processed image can be reduced, and quality of the image on which color processing is performed is improved.

In a possible implementation, the determining a third color adjustment coefficient based on the electrical signal ratio includes: determining the third color adjustment coefficient based on the electrical signal ratio and a second power function, where the third color adjustment coefficient is a value obtained by substituting the electrical signal ratio into the second power function.

In a possible implementation, an exponent of the first power function is determined by using a lookup table.

In a possible implementation, an exponent of the second power function is determined by using a lookup table.

In a possible implementation, the N color components include an R component, a G component, and a B component in an RGB space, and the performing color processing on the to-be-processed image based on the N first color adjustment coefficients and the color values of the N color components to obtain a target image includes: performing color processing on the to-be-processed image based on the following formula to obtain the target image:

$$\begin{cases} R' = a_1(R-Y)+Y \\ G' = a_2(G-Y)+Y, \\ B' = a_3(B-Y)+Y \end{cases}$$

where Y represents a luminance value of the to-be-processed image, R, G, and B respectively represent a color value of the R component, a color value of the G component, and a color value of the B component in the to-be-processed image, R', G', and B' respectively represent a color value of an R component, a color value of a G component, and a color value of a B component in the target image, $a_1$ represents a first color adjustment coefficient corresponding to the R component, $a_2$ represents a first color adjustment coefficient corresponding to the G component, and $a_3$ represents a first color adjustment coefficient corresponding to the B component.

In a possible implementation, the N color components include a U component and a V component in a YUV space, and the performing color processing on the to-be-processed image based on the N first color adjustment coefficients and the color values of the N color components to obtain a target image includes: performing color processing on the to-be-processed image based on the following formula to obtain the target image:

$$\begin{cases} u' = a_4 u \\ v' = a_5 v \end{cases},$$

where u and v respectively represent a color value of the U component and a color value of the V component in the to-be-processed image, u' and v' respectively represent a color value of a U component and a color value of a V component in the target image, $a_4$ represents a first color adjustment coefficient corresponding to the U component, and $a_5$ represents a first color adjustment coefficient corresponding to the V component.

According to a third aspect, an image processing apparatus is provided. The apparatus includes modules configured to perform the method according to the first aspect. Based on a same application concept, a problem resolving principle of the apparatus corresponds to a solution in the method design according to the first aspect. Therefore, for implementation of the apparatus, refer to implementation of the method, and repeated parts are not described again.

According to a fourth aspect, an image processing apparatus is provided. The apparatus includes modules configured to perform the method according to the second aspect. Based on a same application concept, a problem resolving principle of the apparatus corresponds to a solution in the method design according to the second aspect. Therefore, for implementation of the apparatus, refer to implementation of the method, and repeated parts are not described again.

According to a fifth aspect, an apparatus is provided. The apparatus includes a memory and a processor. The memory is configured to store a program, the processor is configured to execute the program, and when the program is executed, the processor is configured to perform the method according to the first aspect.

According to a sixth aspect, an apparatus is provided. The apparatus includes a memory and a processor. The memory is configured to store a program, the processor is configured to execute the program, and when the program is executed, the processor is configured to perform the method according to the second aspect.

According to a seventh aspect, a system chip is provided. The system chip includes modules configured to perform the method according to the first aspect.

According to an eighth aspect, a system chip is provided. The system chip includes modules configured to perform the method according to the second aspect.

BRIEF DESCRIPTION OF THE DRAWINGS

To describe the technical solutions in the embodiments of the present application more clearly, the following briefly describes the accompanying drawings required for describing the embodiments or the prior art. Apparently, the accompanying drawings in the following description show merely some embodiments of the present application, and a person of ordinary skill in the art may derive other drawings from these accompanying drawings without creative efforts.

DETAILED DESCRIPTION

Figure 1:
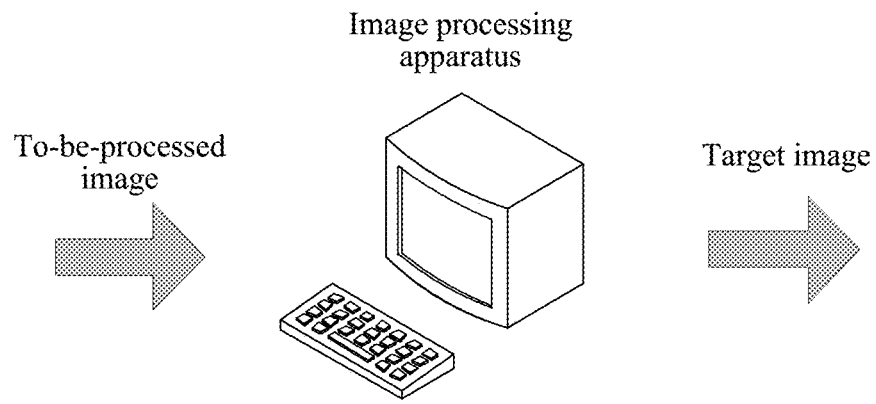
FIG. 1 is a schematic diagram of an application scenario of image processing according to an embodiment of the present application.
Figure 2:
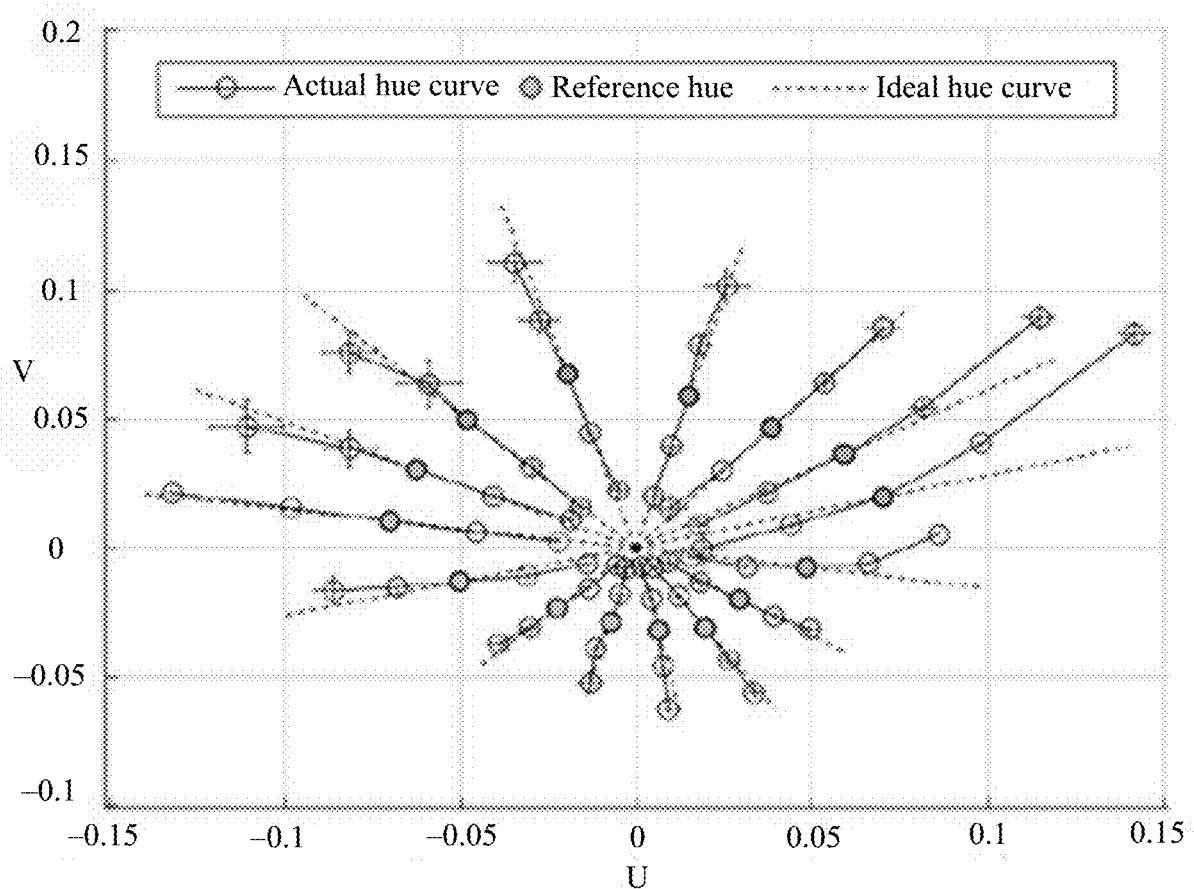
FIG. 2 is a schematic diagram of color distribution of an image according to an embodiment of the present application.

The following clearly describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

To easily understand the embodiments of the present application, some elements used in description of the embodiments of the present application are first described herein.

An electrical signal value is a numerical expression value that represents an image luminance or a color component. The electrical signal value may be used to represent a Y component in a YUV space, or an R component, a G component, or a B component in an RGB space.

A color value is a numerical expression value that represents an image color component. The color value may be used to represent a U component and a V component in a YUV space, or an R component, a G component, or a B component in an RGB space.

A luminance value is a numerical expression value that represents an image luminance component. The luminance value may be used to represent a Y component in a YUV space.

To improve quality of an image on which color processing is performed, or more specifically, to reduce a color deviation (in other words, a color cast) of the image after color processing is performed, embodiments of the present application provide an image processing method and apparatus. In the method, N first color adjustment coefficients corresponding to N color components of each pixel of a to-be-processed image may be respectively determined, and color processing is performed on the to-be-processed image based on the N first color adjustment coefficients. Therefore, a color cast of the image after color processing is performed can be reduced, and quality of the image on which color processing is performed is improved. N is a natural number greater than 1.

In the prior art, image color adjustment methods are mainly converting a color value of each pixel of an image based on a given color adjustment coefficient to obtain a processed image. For example, for an RGB space, image color adjustment is usually performed based on the following formula:

$$\begin{cases} R' = a(R-Y)+Y \\ G' = a(G-Y)+Y, \\ B' = a(B-Y)+Y \end{cases}$$

where Y represents a luminance value of a to-be-processed image, R, G, and B respectively represent a color value of an R component, a color value of a G component, and a color value of a B component in the to-be-processed image, R', G', and B' respectively represent a color value of an R component, a color value of a G component, and a color value of a B component in a target image, and a represents the color adjustment coefficient.

For a YUV space, image color adjustment is usually performed based on the following formula:

$$\begin{cases} u' = au \\ v' = av \end{cases},$$

where u and v respectively represent a color value of a U component and a color value of a V component in a to-be-processed image, u' and v' respectively represent a color value of a U component and a color value of a V component in a target image, and a represents the color adjustment coefficient.

It can be learned that, in the prior art, each color component in a color space on which color processing is performed corresponds to the same color adjustment coefficient. However, in the embodiments of the present application, a plurality of (N) color adjustment coefficients are used to perform color processing. In other words, the color adjustment coefficients corresponding to the color components may be different. The color space may be the YUV space or the RGB space. The color components may be the U component and the V component in the YUV space. Alternatively, the color components may be the R component, the G component, and the B component in the RGB space.

Figure 3:
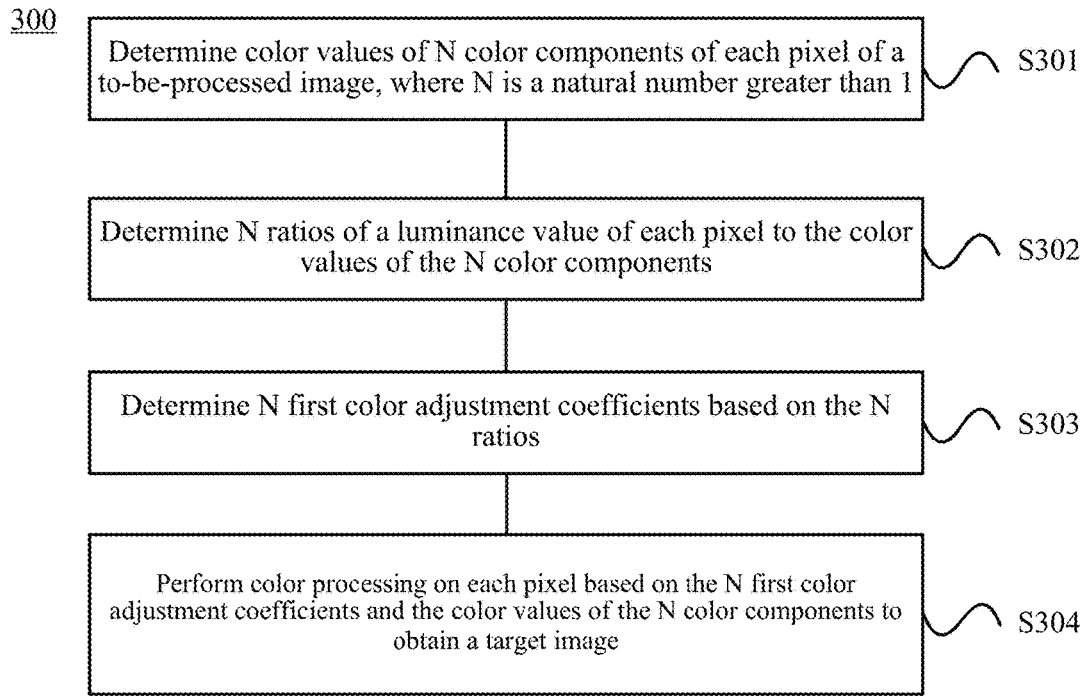
FIG. 3 is a schematic block diagram of an image processing method according to an embodiment of the present application.

FIG. 3 is a schematic diagram of an image processing method according to an embodiment of the present application. As shown in FIG. 3, the method 300 includes the following steps.

S301: Determine color values of N color components of each pixel of a to-be-processed image, where N is a natural number greater than 1.

Optionally, in this embodiment of the present application, a color may include a hue and a saturation. The N color components may be used to represent components of colors in a color space of the image. For example, the color components may be a U component and a V component in a YUV space. Alternatively, the color components may be an R component, a G component, and a B component in an RGB space. In addition, the component may also be referred to as a channel, a signal, a color component, or the like. The color component may also be referred to as a channel of the color space, a color component of the color space, or the like. The color value of the color component may also be understood as a corresponding color component value, a corresponding color channel value, a corresponding color component value, or the like.

S302: Determine N ratios of a luminance value of each pixel to the color values of the N color components.

Optionally, the luminance value of each pixel of the to-be-processed image may be determined by using a plurality of manners. For example, for the YUV space, the luminance value may be a color value of the Y component in the YUV space. For the RGB space, the color value of the Y component may be calculated based on color values of the R component, the G component, and the B component. For example, the color value of the Y component may be calculated based on a formula: $Y=a_{11}*R+a_{12}*G+a_{13}*B$, where $a_{11}$, $a_{12}$, and $a_{13}$ are fixed coefficients. A person skilled in the art can understand that there are a plurality of options of values of $a_{11}$, $a_{12}$, and $a_{13}$, and this is not limited in this embodiment of the present application. For example, $Y=0.2126*R+0.7152*G+0.0722*B$, or $Y=0.2627*R+0.6780*G+0.0593*B$.

For example, for the YUV space, the N (N=2) ratios may be Y/U and Y/V. For the RGB space, the N (N=3) ratios may be Y/R, Y/G, and Y/B. Y, U, V, R, G, and B each represent the color value of each color component.

S303: Determine N first color adjustment coefficients based on the N ratios.

Optionally, the N first color adjustment coefficients may be determined by using a plurality of manners. For example, the N first color adjustment coefficients may be obtained by using an experimental data calibration method. Alternatively, the N first color adjustment coefficients may be determined based on the ratios of the luminance value of the to-be-processed image to the color values of the N color components.

S304: Perform color processing on each pixel based on the N first color adjustment coefficients and the color values of the N color components to obtain a target image.

Optionally, for the RGB space, color processing may be performed on the to-be-processed image by using the following formula:

$$\begin{cases} R' = a_1(R-Y)+Y \\ G' = a_2(G-Y)+Y, \\ B' = a_3(B-Y)+Y \end{cases}$$

where Y represents the luminance value of the to-be-processed image, R, G, and B respectively represent the color value of the R component, the color value of the G component, and the color value of the B component in the to-be-processed image, R', G', and B' respectively represent a color value of an R component, a color value of a G component, and a color value of a B component in the target image, $a_1$ represents a first color adjustment coefficient corresponding to the R component, $a_2$ represents a first color adjustment coefficient corresponding to the G component, and $a_3$ represents a first color adjustment coefficient corresponding to the B component.

Optionally, for the YUV space, color processing may be performed on the to-be-processed image by using the following formula:

$$\begin{cases} u' = a_4 u \\ v' = a_5 v \end{cases},$$

where u and v respectively represent the color value of the U component and the color value of the V component in the to-be-processed image, u' and v' respectively represent a color value of a U component and a color value of a V component in the target image, $a_4$ represents a first color adjustment coefficient corresponding to the U component, and $a_5$ represents a first color adjustment coefficient corresponding to the V component.

A person skilled in the art may understand that a process of performing color processing on the to-be-processed image is a process of sequentially performing color adjustment on the pixels of the to-be-processed image. Therefore, the N first color adjustment coefficients and the N color components in this embodiment of the present application may be understood as N first color adjustment coefficients corresponding to the pixels of the to-be-processed image or N color components corresponding to the pixels.

In this embodiment of the present application, the N first color adjustment coefficients are determined based on the N ratios of the luminance value of each pixel of the to-be-processed image to the color values of the N color components, so as to perform color processing on the to-be-processed image. Therefore, a color deviation of the image on which color processing is performed can be reduced, and quality of the image on which color processing is performed is improved.

Optionally, in the method 300, the determining N first color adjustment coefficients based on the N ratios may include a plurality of manners. For example, the N ratios may be directly determined as the N first color adjustment coefficients.

Optionally, N second color adjustment coefficients may be determined based on the N ratios and a dedicated function. The N first color adjustment coefficients are then determined based on the N second color adjustment coefficients. The dedicated function may be used to represent correspondences between the N ratios and the N second color adjustment coefficients. For example, the dedicated function may be a power function or a linear function. For example, the linear function may be f(x)=x. It is assumed that the power function is referred to as a first power function. The first power function may be expressed as $f(x)=x^b$. The exponent b of the first power function is a function coefficient. Specifically, the N second color adjustment coefficients may be determined based on the N ratios and the first power function. The N first color adjustment coefficients are then determined based on the N second color adjustment coefficients. The N second color adjustment coefficients are values obtained by respectively substituting the N ratios into the first power function. The coefficient b of the first power function may be determined by using a lookup table based on statistics of the image or statistics of a sequence of the image. The statistics of the image or the statistics of the sequence of the image may include a maximum value, a minimum value, an average value, a standard deviation, and histogram distribution information of the image or the sequence of the image.

For example, in a specific embodiment, a person skilled in the art may establish a correspondence between the exponent of the first power function and an average luminance value of the to-be-processed image based on experimental data or experience. Herein, the average luminance value of the to-be-processed image may be an average value of luminance of the to-be-processed image or the sequence of the to-be-processed image. In an example, the correspondence may be shown in Table 1. A range of the average luminance value in Table 1 is [0, 1].

TABLE 1

| Average luminance value | 0.1 | 0.25 | 0.3 | 0.55 | 0.6 |
|---|---|---|---|---|---|
| Exponent of the first power function | 1.2 | 1.0 | 0.8 | 0.6 | 0.2 |

Optionally, as shown in Table 1, when the average luminance value of the to-be-processed image is obtained, the average luminance value may be an average value of the Y components of the to-be-processed image, or an average value of other components of the to-be-processed image. When the average luminance value is less than 0.1, the exponent of the first power function may be set to 1.2. When the average luminance value is greater than 0.6, the exponent of the first power function may be set to 0.2. When the average luminance value is between two values in the table, an exponent value of the first power function may be obtained by using an interpolation manner. The interpolation manner is not limited in this embodiment of the present application. For example, manners such as linear interpolation, or quadratic linear interpolation may be used. For example, when the average luminance value is between 0.55 and 0.6, the following linear interpolation manner may be used to obtain the exponent value of the first power function:

output=0.6+(0.2−0.6)*(input−0.55)/(0.6−0.55)

where output represents the exponent value of the first power function, and input represents the average luminance value of the to-be-processed image or the sequence of the to-be-processed image.

In this embodiment of the present application, the N second color adjustment coefficients are determined based on the first power function and the N ratios of the luminance value of each pixel of the to-be-processed image to the color values of the N color components, and the N first color adjustment coefficients are determined based on the N second color adjustment coefficients, so as to perform color processing on the to-be-processed image. Therefore, the color deviation of the image on which color processing is performed can be reduced, and the quality of the image on which color processing is performed is improved.

Optionally, in the method 300, the determining the N first color adjustment coefficients based on the N second color adjustment coefficients may include a plurality of methods. For example, the N second color adjustment coefficients may be directly used as the N first color adjustment coefficients. Alternatively, the N first color adjustment coefficients may be determined based on a third color adjustment coefficient of each pixel and the N second color adjustment coefficients. For example, the N first color adjustment coefficients may be N products obtained by multiplying the third color adjustment coefficient by the N second color adjustment coefficients respectively.

The third color adjustment coefficient may be a given color adjustment coefficient of the to-be-processed image or may be determined based on another manner. For example, the to-be-processed image may be an image on which dynamic range adjustment processing has been performed, and the dynamic range adjustment processing represents performing compression or stretching processing on electrical signal values (for example, the Y component, the R component, the G component, and the B component) of the image. A color deviation may be caused to the image by performing dynamic range adjustment processing on the image. The third color adjustment coefficient may be determined based on an electrical signal ratio. The electrical signal ratio may be an electrical signal ratio of an electrical signal value of each pixel after the dynamic range adjustment processing to an electrical signal value of the pixel before the dynamic range adjustment processing. The electrical signal value may be the Y component in the YUV space, or the R component, the G component, or the B component in the RGB space.

For example, in the YUV color space, the performing dynamic range adjustment processing on the electrical signal values of the to-be-processed image may be shown in the following formula:

$Y_2 = cY_1$ where the electrical signal value before the dynamic range adjustment processing is $Y_1$, the electrical signal value after the dynamic range adjustment processing is $Y_2$, and c is the electrical signal ratio of the electrical signal value after the dynamic range adjustment processing to the electrical signal value before the dynamic range adjustment processing.

For another example, in the RGB color space, the performing dynamic range adjustment processing on the color values of the to-be-processed image may be shown in the following formula:

$$\begin{cases} R_2 = fR_1 \\ G_2 = fG_1 \\ B_2 = fB_1 \end{cases},$$

where color values before the dynamic range adjustment processing are $R_1$, $G_1$, and $B_1$, color values after the dynamic range adjustment processing are $R_2$, $G_2$, and $B_2$, and f is the electrical signal ratio of the electrical signal value after the dynamic range adjustment processing to the electrical signal value before the dynamic range adjustment processing.

In this embodiment of the present application, the N first color adjustment coefficients of the to-be-processed image are determined based on the N ratios of the luminance value of the to-be-processed image to the color values of the N color components and the electrical signal ratio of the electrical signal value after the dynamic range adjustment processing is performed on the to-be-processed image to the electrical signal value before the dynamic range adjustment processing is performed on the to-be-processed image, so as to perform color processing on the to-be-processed image. Therefore, the color deviation caused by the dynamic range adjustment processing can be reduced, and the quality of the image on which color processing is performed is improved.

Optionally, the determining the third color adjustment coefficient based on the electrical signal ratio includes a plurality of manners. For example, the electrical signal ratio may be directly determined as the third color adjustment coefficient. For another example, the third color adjustment coefficient may be determined based on the electrical signal ratio and a second power function, and the third color adjustment coefficient may be a value obtained by substituting the electrical signal ratio into the second power function. The second power function may be expressed as $f(x)=x^d$, and the exponent d of the second power function is a function coefficient. A value of d may be a fixed value selected by a person skilled in the art based on experimental data or experience or may be determined by using a lookup table based on statistics of the image or statistics of a sequence of the image. The statistics of the image or the statistics of the sequence of the image may include a maximum value, a minimum value, an average value, a standard deviation, and histogram distribution information of the image or the sequence of the image.

For example, in a specific embodiment, a person skilled in the art may establish a correspondence between the exponent of the second power function and the average luminance value of the to-be-processed image based on experimental data or experience. Herein, the average luminance value of the to-be-processed image may be an average value of luminance of the to-be-processed image or the sequence of the to-be-processed image. In an example, the correspondence may be shown in Table 2. The average luminance value in Table 2 is represented in a normalized manner, and a range of the average luminance value is [0, 1]. 1 represents a maximum value of the luminance value, and 0 represents a minimum value of the luminance value.

TABLE 2

| Average luminance value | 0.1 | 0.25 | 0.3 | 0.55 | 0.6 |
|---|---|---|---|---|---|
| Exponent of the second power function | 0.1 | 0.15 | 0.2 | 0.25 | 0.3 |

For convenience and brevity of description, in the method corresponding to Table 2, for a method for searching for the exponent of the second power function, refer to detailed descriptions related to Table 1. Details are not described herein again.

Optionally, in the method 300, the N first color adjustment coefficients may be preset. For example, the N first color adjustment coefficients may be obtained through experimental data calibration. For example, a mapping relationship between the N first color adjustment coefficients and the color values of the N color components of the pixel may be collected based on experimental data, and the N first color adjustment coefficients are determined based on the mapping relationship.

In this embodiment of the present application, the N first color adjustment coefficients corresponding to each pixel of the to-be-processed image are respectively determined based on analysis of the experimental data, so as to perform color processing on the to-be-processed image. Therefore, the quality of the image on which color processing is performed can be improved.

Optionally, in an example, the RGB space is used as an example. Table 3 shows the mapping relationship between the N (N=2) first color adjustment coefficients and the color values of the N color components that is collected based on the experimental data. R, G, and B respectively represent the color value of the R component, the color value of the G component, and the color value of the B component in the to-be-processed image, $a_1$ represents the first color adjustment coefficient corresponding to the R component, $a_2$ represents the first color adjustment coefficient corresponding to the G component, and $a_3$ represents the first color adjustment coefficient corresponding to the B component. The R component, the G component, and the B component in Table 3 are represented in a normalized manner, and ranges of the components are respectively [0, 1]. 1 represents a maximum value of each component value, and 0 represents a minimum value of each component value.

TABLE 3

| $R^2 + G^2 + B^2$ | 0 to 0.2 | 0.2 to 0.5 | 0.5 to 1.0 | 1.0 to 2.0 | 2.0 to 3.0 |
|---|---|---|---|---|---|
| $a_1$ | 1.1 | 1.1 | 1.2 | 1.2 | 1.2 |
| $a_2$ | 1.0 | 1.0 | 1.0 | 1.0 | 1.0 |
| $a_3$ | 1.2 | 1.3 | 1.4 | 1.5 | 1.6 |

As shown in Table 3, after obtaining the values of the R component, the G component, and the B component of the pixel of the to-be-processed image, a person skilled in the art may determine the first color adjustment coefficients respectively corresponding to the R component, the G component, and the B component by using the lookup table.

Similarly, in an example, the YUV space is used as an example. Table 4 shows the mapping relationship between the N first color adjustment coefficients and the color values of the N color components that is collected based on the experimental data. u represents the color value of the U component, and v represents the color value of the V component. $a_4$ represents the first color adjustment coefficient corresponding to the U component, and $a_5$ represents the first color adjustment coefficient corresponding to the V component. The U component and the V component in Table 4 are represented in a normalized manner, and ranges of the components are respectively [0, 1]. 1 represents a maximum value of each component value, and 0 represents a minimum value of each component value.

TABLE 4

| $u^2 + v^2$ | 0 to 0.05 | 0.05 to 0.1 | 0.1 to 0.15 | 0.15 to 0.2 | 0.2 to 0.5 |
|---|---|---|---|---|---|
| $a_4$ | 1.0 | 1.1 | 1.2 | 1.2 | 1.2 |
| $a_5$ | 1.2 | 1.3 | 1.4 | 1.5 | 1.6 |

As shown in Table 4, after obtaining the values of the U component and the V component of the pixel of the to-be-processed image, a person skilled in the art may determine the first color adjustment coefficients respectively corresponding to the U component and the V component by using the lookup table.

Figure 4:
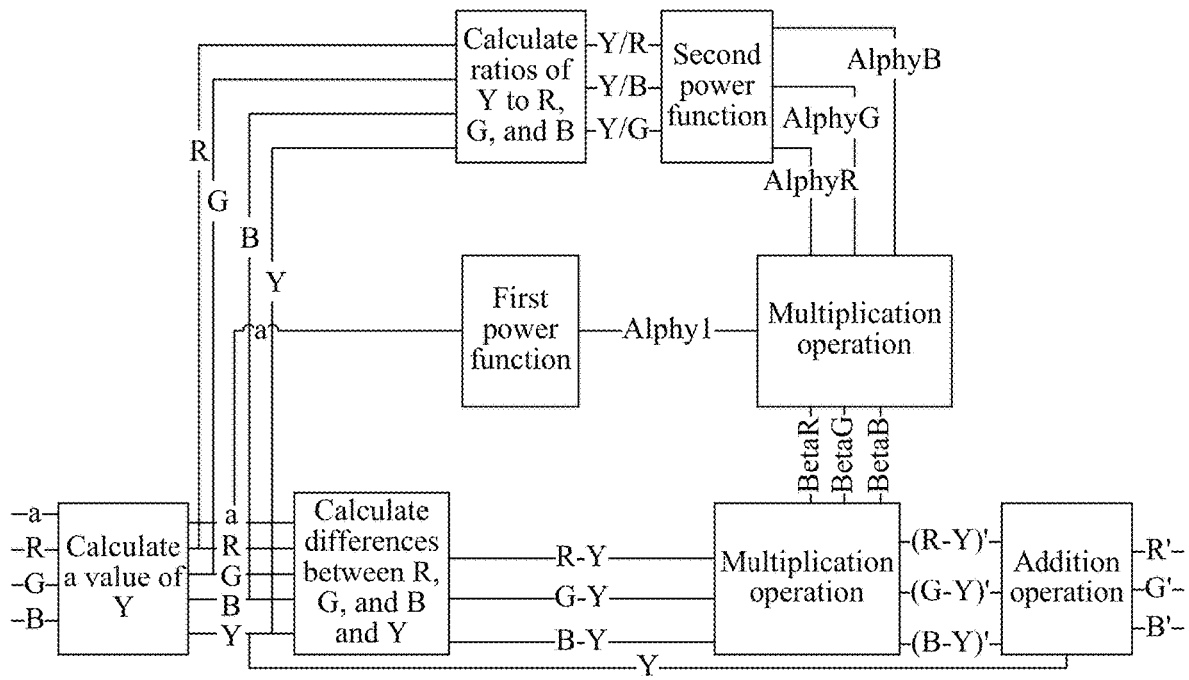
FIG. 4 is a schematic flowchart of an image processing method according to another embodiment of the present application.

The image processing method 300 according to this embodiment of the present application is described above, and an embodiment of the present application is described in more detail below with reference to a specific example in FIG. 4. It should be noted that the example in FIG. 4 is merely intended to help a person skilled in the art understand this embodiment of the present application, instead of limiting this embodiment of the present application to the specific illustrated numerical values or the illustrated specific scenario. Apparently, a person skilled in the art can make various equivalent modifications or changes based on the provided example in FIG. 4, and such modifications and changes also fall within the scope of the embodiments of the present application.

FIG. 4 is a schematic flowchart of an image processing method 400 according to an embodiment of the present application. The example in FIG. 4 may be applied to an RGB space. FIG. 4 mainly shows a procedure of determining N first color adjustment coefficients. A solution in FIG. 4 may be applied to a process of converting from an HDR to an SDR. Alternatively, the solution of FIG. 4 may be applied to a process of converting from an SDR to an HDR. In the solution in FIG. 4, dynamic range adjustment processing has been performed on a to-be-processed image before color processing. As shown in FIG. 4, the method 400 includes the following steps.

401: Obtain color values R, G, and B of N (N=3) color components of each pixel of the to-be-processed image and an electrical signal ratio a of the to-be-processed image.

a may be an electrical signal ratio of an electrical signal value of each pixel of the to-be-processed image after the dynamic range adjustment processing to an electrical signal value before the dynamic range adjustment processing.

402: Calculate a luminance value Y of each pixel of the to-be-processed image based on the color values R, G, and B.

For example, Y may be determined based on the foregoing formula $Y = a_{11}*R + a_{12}*G + a_{13}*B$.

403: Substitute a into a second power function to obtain a third color adjustment coefficient AlphyI, where the second power function is $f(x) = x^d$.

The coefficient d may be determined by using a lookup table based on statistics of the image or statistics of a sequence of the image. For example, the coefficient d may be determined based on Table 2. Alternatively, d may be a fixed value, for example, 0.2, selected based on experience.

For convenience and brevity of description, for a specific manner of determining the coefficient d of the second power function, refer to detailed descriptions related to the manner of determining the coefficient d of the second power function in the method 300. Details are not described herein again.

404: Respectively calculate ratios Y/R, Y/G, and Y/B of the luminance value to the N color components.

405: Respectively substitute Y/R, Y/G, and Y/B into a first power function to obtain second color adjustment coefficients AlphyR, AlphyG, and AlphyB respectively corresponding to the N color components, where the first power function is $f(x) = x^b$.

The coefficient b may be determined by using a lookup table based on statistics of the image or statistics of a sequence of the image. For example, the coefficient b may be determined based on Table 1.

For convenience and brevity of description, for a specific manner of obtaining the coefficient b of the first power function, refer to detailed descriptions related to the manner of determining the coefficient b of the first power function in the method 300. Details are not described herein again.

406: Multiply AlphyI by AlphyR, AlphyG, and AlphyB respectively to obtain N first color adjustment coefficients BetaR, BetaG, and BetaB.

407: Calculate, based on BetaR, BetaG, BetaB, and the following formula, color values R', G', and B' corresponding to N color channels of each pixel after color processing is performed:

$$\begin{cases} R' = a_1(R-Y)+Y \\ G' = a_2(G-Y)+Y \\ B' = a_3(B-Y)+Y \end{cases}$$

where values of $a_1$, $a_2$, and $a_3$ are respectively BetaR, BetaG, and BetaB.

In this embodiment of the present application, the N first color adjustment coefficients are determined based on the N ratios of the luminance value of each pixel of the to-be-processed image to the color values of the N color components, so as to perform color processing on the to-be-processed image. Therefore, a color deviation of the image on which color processing is performed can be reduced, and quality of the image on which color processing is performed is improved.

The image processing methods according to the embodiments of the present application are described in detail above with reference to FIG. 1 to FIG. 4, and image processing apparatuses according to embodiments of the present application are described in detail below with reference to FIG. 5 and FIG. 6.

Figure 5:
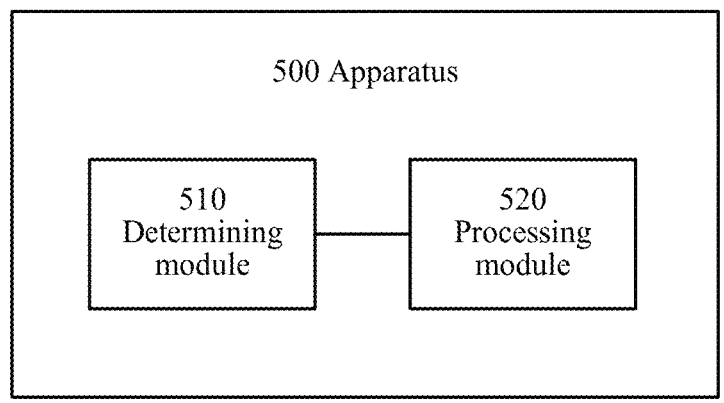
FIG. 5 is a schematic diagram of an image processing apparatus according to an embodiment of the present application.

FIG. 5 is a schematic diagram of an apparatus 500 according to an embodiment of the present application. It should be understood that the apparatus 500 in FIG. 5 can implement the steps of the methods in FIG. 1 to FIG. 4. Repeated descriptions are properly omitted for brevity. The apparatus 500 includes:

a determining module 510, configured to: determine color values of N color components of each pixel of a to-be-processed image, where N is a natural number greater than 1; determine N ratios of a luminance value of each pixel to the color values of the N color components; and determine N first color adjustment coefficients based on the N ratios; and a processing module 520, configured to perform color processing on each pixel based on the N first color adjustment coefficients and the color values of the N color components to obtain a target image.

In this embodiment of the present application, the N first color adjustment coefficients corresponding to the N color components of the pixel of the to-be-processed image may be respectively determined, and color processing is performed on the to-be-processed image based on the N first color adjustment coefficients. Therefore, a color cast of the image on which color processing is performed can be reduced, and quality of the image on which color processing is performed is improved.

Figure 6:
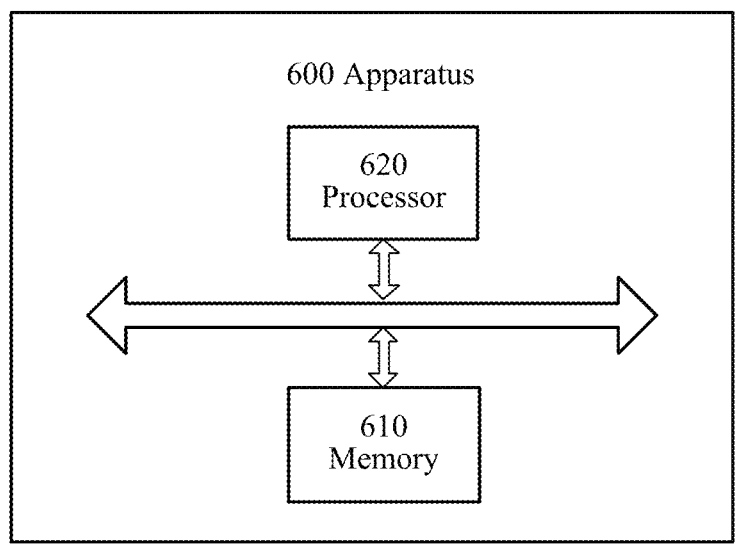
FIG. 6 is a schematic diagram of an image processing apparatus according to another embodiment of the present application.

FIG. 6 is a schematic diagram of an apparatus 600 according to an embodiment of the present application. It should be understood that the apparatus in FIG. 6 can implement the steps of the methods in FIG. 1 to FIG. 4. Repeated descriptions are properly omitted for brevity. The apparatus 600 includes:

a memory 610, configured to store a program; and a processor 620, configured to execute the program in the memory 610, where when the program is executed, the processor 620 is configured to: determine color values of N color components of each pixel of a to-be-processed image, where N is a natural number greater than 1; determine N ratios of a luminance value of each pixel to the color values of the N color components; determine N first color adjustment coefficients based on the N ratios; and perform color processing on each pixel based on the N first color adjustment coefficients and the color values of the N color components to obtain a target image.

In this embodiment of the present application, the N first color adjustment coefficients corresponding to the N color components of the pixel of the to-be-processed image may be respectively determined, and color processing is performed on the to-be-processed image based on the N first color adjustment coefficients. Therefore, a color cast of the image on which color processing is performed can be reduced, and quality of the image on which color processing is performed is improved.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present application, "B corresponding to A" indicates that B is associated with A, and B may be determined according to A. However, it should further be understood that determining A according to B does not mean that B is determined according to A only; that is, B may also be determined according to A and/or other information.

It should be understood that sequence numbers of the foregoing processes do not mean execution sequences in the embodiments of the present application. The execution sequences of the processes should be determined according to functions and internal logic of the processes, and should not be construed as any limitation on the implementation processes of the embodiments of the present application.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments of the present application.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

For brevity and clarity of the application document, technical features and descriptions in an embodiment above may be understood as being applicable to other embodiments, and are no longer described in detail one by one in the other embodiments.

The foregoing descriptions are merely specific embodiments of the present application, but are not intended to limit the protection scope of the present application. Any modification or replacement readily figured out by a person skilled in the art within the technical scope disclosed in the present application shall fall within the protection scope of the present application. Therefore, the protection scope of the present application shall be subject to the protection scope of the claims.

What is claimed is:

1. An image processing method, comprising:
    obtaining color values red (R), green (G), and blue (B) of a first pixel of a to-be-processed image, wherein the first pixel is one of a plurality of pixels in the to-be-processed image, and the to-be-processed image is an image on which dynamic range adjustment processing has been performed;
    obtaining a luminance value $Y_2$ of the first pixel based on the color values R, G, and B;
    obtaining an electrical signal ratio of the first pixel; wherein the electrical signal ratio indicates a ration of the luminance value $Y_2$ of the first pixel after the dynamic range adjustment processing to a luminance value $Y_1$ of the first pixel before the dynamic range adjustment processing;
    determining, a color adjustment coefficient of the first pixel based on the electrical signal ratio and a power function, wherein the color adjustment coefficient is used to adjust a color value of a color component of the first pixel, wherein the color component is a color component in a color space comprising one luminance component and two color components, and
    adjusting the color component based on the color adjustment coefficient.

2. The method according to claim 1, wherein the power function is as follows:

$$f(x)=x^d$$

wherein, x indicates the electrical signal ratio, d indicates an exponent of the power function, f indicates the color adjustment coefficient.

3. The method according to claim 2, wherein d is obtained by using a lookup table.

4. The method according to claim 2, wherein d is a preset value.

5. The method according to claim 2, wherein d is obtained based on statistics of the to-be-processed image.

6. The method according to claim 5, wherein a correspondence between d and the statistics of the to-be-processed image is preset in a lookup table.

7. The method according to claim 6, wherein the statistics of the to-be-processed image comprises any one of the following: a maximum value, a minimum value, an average value, a standard deviation, or histogram distribution information of the to-be-processed image.

8. The method according to claim 1, wherein further comprising:
    adjusting, according to the color adjustment coefficient, a color value of the first pixel of the to-be-processed image.

9. The method according to claim 8, wherein the first pixel comprises a U component and a V component in a YUV space; wherein adjusting the color value of the first pixel of the to-be-processed image based on the following formulas:

$$u'=fu;$$

$$v'=fv;$$

wherein u and v respectively represent a color value of the U component and a color value of the V component of the first pixel, u' and v' respectively represent a color value of a U component and a color value of a V component after the color adjustment; wherein f represents the color adjustment coefficient of the first pixel.

10. An image processing apparatus, comprising:
    a processor; and
    a memory coupled to the processor and for storing instructions that, when executed by the processor, cause the apparatus to:
    obtain color values red (R), green (G), and blue (B) of color components of a first pixel of a to-be-processed image, wherein the first pixel is one of a plurality of pixels comprised in the to-be-processed image; wherein the to-be-processed image is an image on which dynamic range adjustment processing has been performed;
    obtain a luminance value $Y_2$ of the first pixel based on the color values R, G, and B;
    obtain an electrical signal ratio of the first pixel; wherein the electrical signal ratio indicates a ration of the luminance value $Y_2$ of the first pixel after the dynamic range adjustment processing to a luminance value $Y_1$ of the first pixel before the dynamic range adjustment processing;

determine, a color adjustment coefficient of the first pixel based on the electrical signal ratio and a power function, wherein the color adjustment coefficient is used to adjust a color value of a color component of the first pixel, wherein the color component is a color component in a color space comprising one luminance component and two color components and adjust the color component based on the color adjustment coefficient.

11. The apparatus according to claim 10, wherein the power function is as follows:

$$f(x)=x^d$$

wherein, x indicates the electrical signal ratio, d indicates an exponent of the power function, f indicates the color adjustment coefficient.

12. The apparatus according to claim 10, wherein d is obtained by using a lookup table.

13. The apparatus according to claim 10, wherein d is a preset value.

14. The apparatus according to claim 10, wherein d is obtained based on statistics of the to-be-processed image.

15. The apparatus according to claim 14, wherein a correspondence between d and the statistics of the to-be-processed image is preset in a lookup table.

16. The apparatus according to claim 15, wherein the statistics of the to-be-processed image comprises any one of the following: a maximum value, a minimum value, an average value, a standard deviation, or histogram distribution information of the to-be-processed image.

17. The apparatus according to claim 10, wherein the instructions, when executed by the processor, further cause the apparatus to:

adjust, according to the color adjustment coefficient, a color value of the first pixel of the to-be-processed image.

18. The apparatus according to claim 17, wherein the first pixel comprises a U component and a V component in a YUV space; wherein the instructions, when executed by the processor, further cause the apparatus to adjust the color value of the first pixel of the to-be-processed image based on the following formulas:

$$u'=fu;$$

$$v'=fv;$$

wherein u and v respectively represent a color value of the U component and a color value of the V component of the first pixel, u' and v' respectively represent a color value of a U component and a color value of a V component after the color adjustment; wherein f represents the color adjustment coefficient of the first pixel.

19. A non-transitory computer-readable storage medium, wherein the computer-readable storage medium stores a program instruction; and when the program instruction runs on a computer or a processor, the computer or the processor is enabled to perform:

obtain color values red (R), green (G), and blue (B) of color components of a first pixel of a to-be-processed image, wherein the first pixel is one of a plurality of pixels comprised in the to-be-processed image; wherein the to-be-processed image is an image on which dynamic range adjustment processing has been performed;

obtain a luminance value $Y_2$ of the first pixel based on the color values R, G, and B;

obtain an electrical signal ratio of the first pixel; wherein the electrical signal ratio indicates a ration of the luminance value $Y_2$ of the first pixel after the dynamic range adjustment processing to a luminance value $Y_1$ of the first pixel before the dynamic range adjustment processing;

determine, a color adjustment coefficient of the first pixel based on the electrical signal ratio and a power function, wherein the color adjustment coefficient is used to adjust a color value of a color component of the first pixel, wherein the color component is a color component in a color space that comprises one luminance component and two color components; and adjust the color component based on the color adjustment coefficient.

20. The non-transitory computer-readable storage medium according to claim 19, wherein the power function is as follows:

$$f(x)=x^d$$

wherein, x indicates the electrical signal ratio, d indicates an exponent of the power function, f indicates the color adjustment coefficient.

21. The non-transitory computer-readable storage medium according to claim 19, wherein d is obtained by using a lookup table.

* * * * *